July 9, 1957  K. A. GRANT  2,798,575
BRAKE MECHANISM FOR TRAILER VEHICLES
Filed Nov. 10, 1953  4 Sheets-Sheet 1
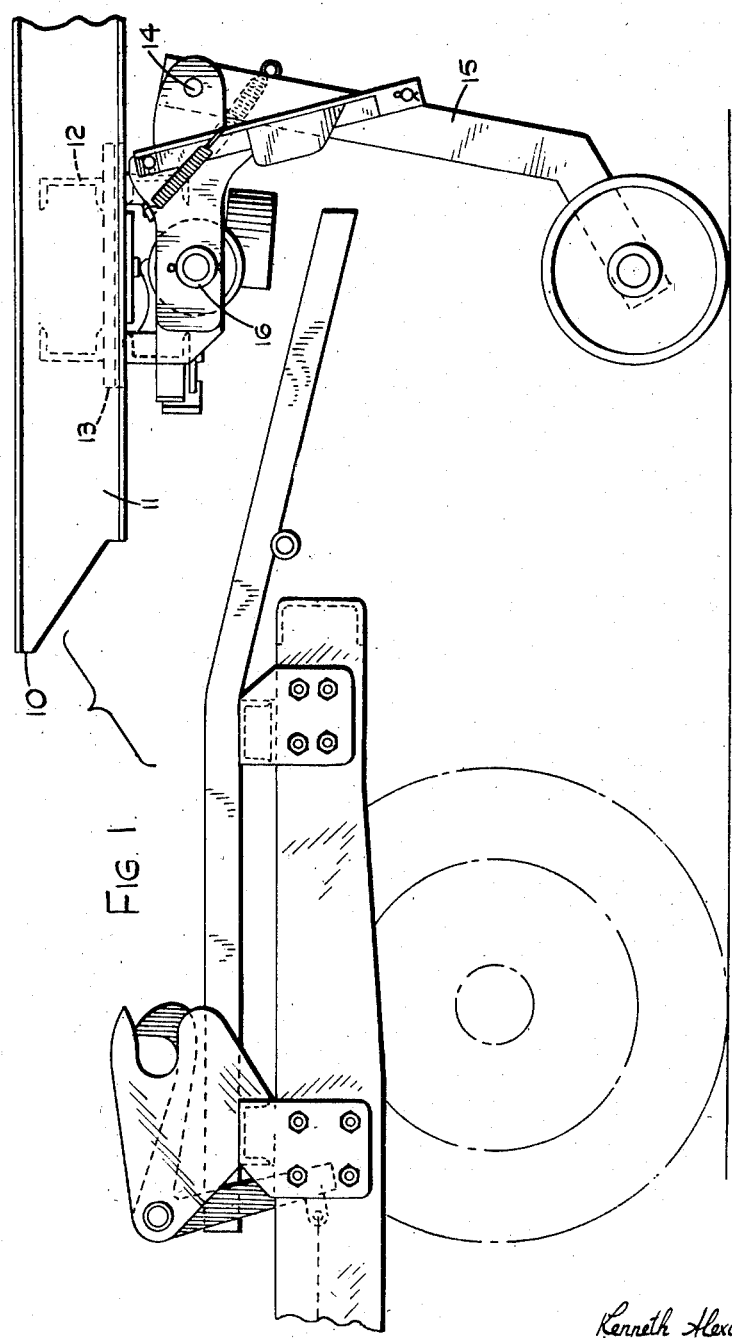
INVENTOR
Kenneth Alexander Grant.
BY Richardson, David and Norton
his ATTORNEYS

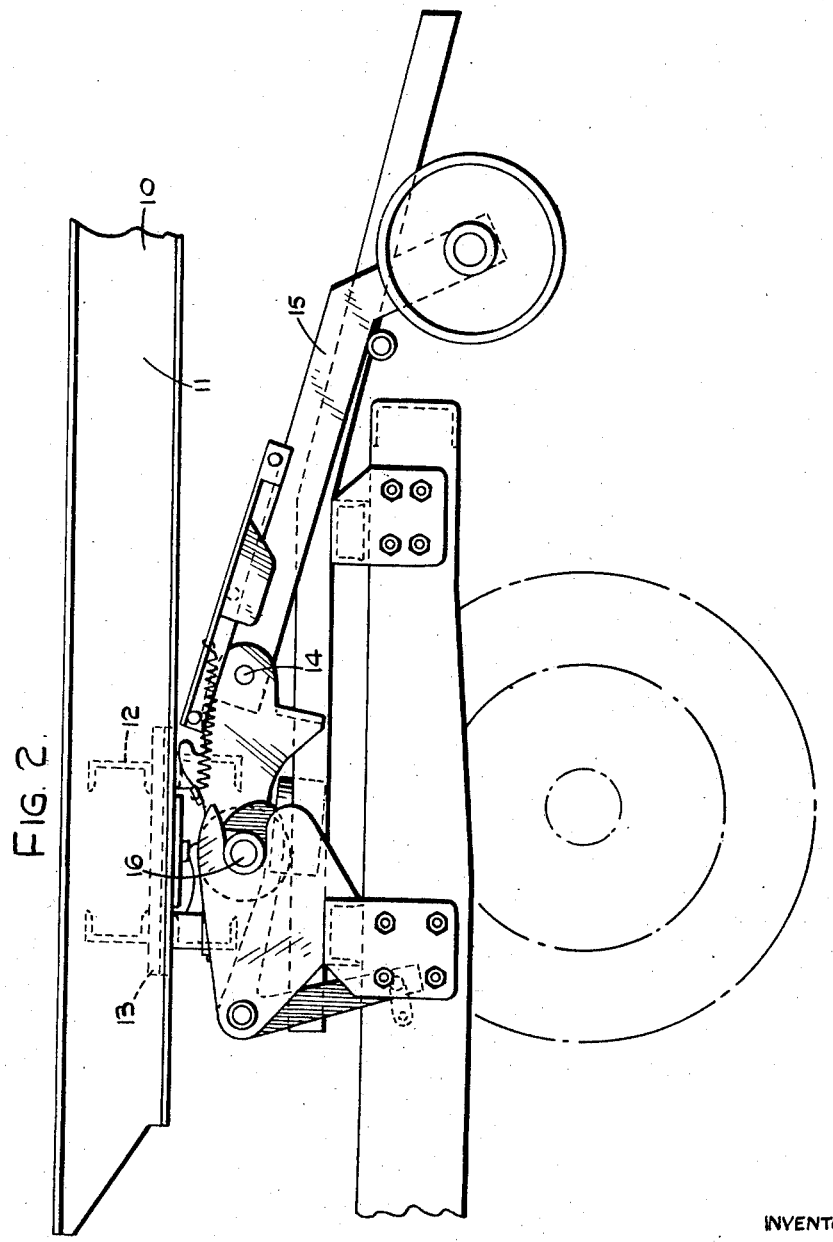

July 9, 1957 K. A. GRANT 2,798,575
BRAKE MECHANISM FOR TRAILER VEHICLES
Filed Nov. 10, 1953 4 Sheets-Sheet 3
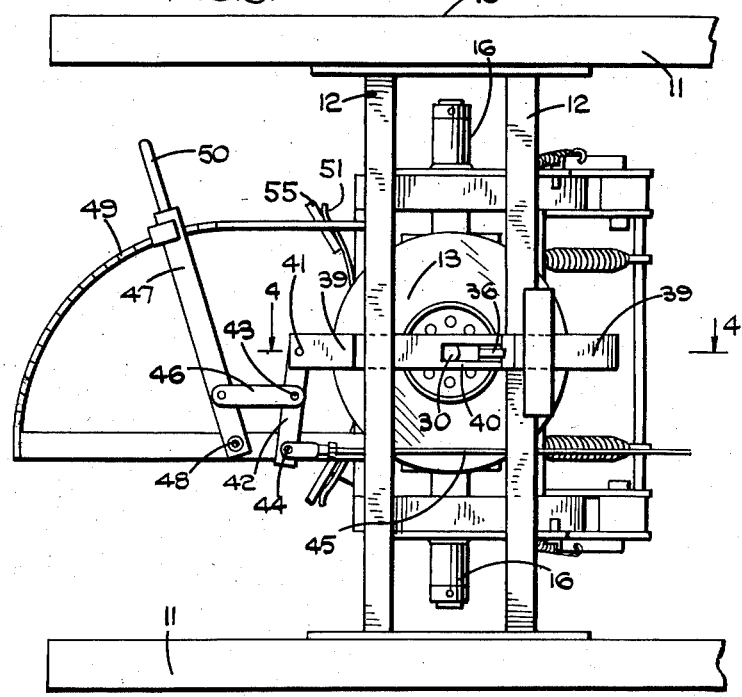
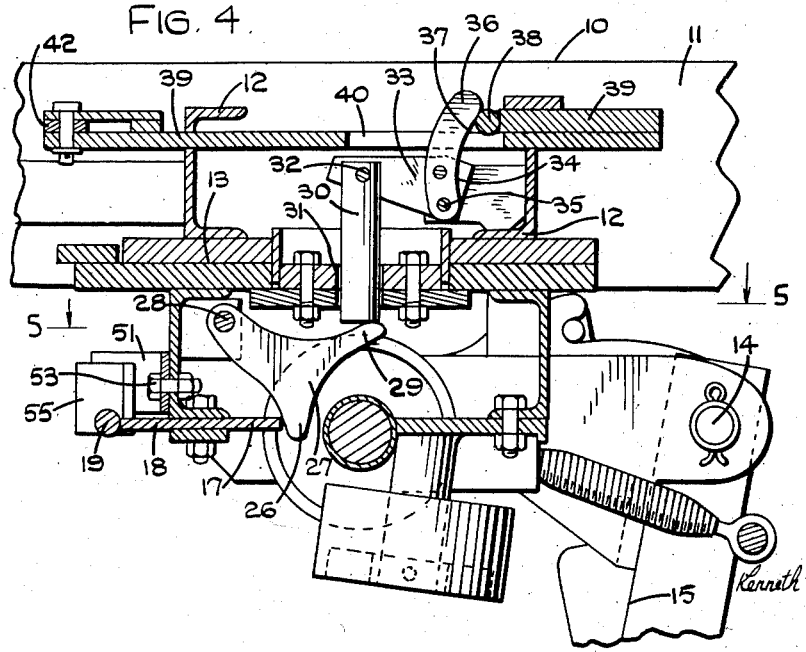
INVENTOR
Kenneth Alexander Grant
BY
Richardson, David and Nordon
his ATTORNEYS July 9, 1957
K. A. GRANT
2,798,575
BRAKE MECHANISM FOR TRAILER VEHICLES
Filed Nov. 10, 1953
4 Sheets-Sheet 4
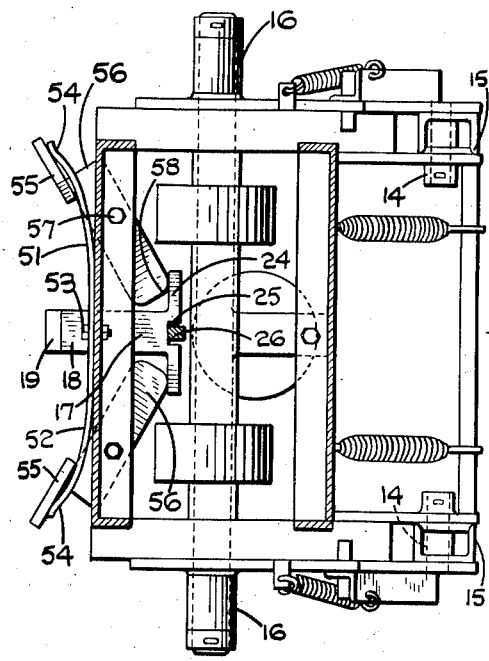
INVENTOR
Kenneth Alexander Grant.
BY
Richardson, David and Nordon
his ATTORNEYS

United States Patent Office 2,798,575
Patented July 9, 1957

2,798,575
BRAKE MECHANISM FOR TRAILER VEHICLES

Kenneth Alexander Grant, Edinburgh, Scotland, assignor to J. Brockhouse & Company Limited, Hill Top West Bromwich, England, a British company Application November 10, 1953, Serial No. 391,288

4 Claims. (Cl. 188—3)

This invention relates to braking mechanism for trailer vehicles which are adapted to be coupled to a tractor vehicle, and has for its object the provision of a new or improved form of such braking mechanism which not only permits of the trailer brake being operated from brake operating mechanism on the tractor but is adapted to apply the trailer brake when the tractor is uncoupled from the trailer, thereby ensuring that the trailer when uncoupled from the tractor is left in a safe condition.

Braking mechanism in accordance with the present invention comprises a brake actuating member mounted displaceably on the trailer and adapted to interengage separably with a further brake actuating member mounted displaceably on the tractor and operable from brake operating means on the tractor, said trailer brake actuating member being operably connected to braking means on the trailer, such as one or more brake shoes, said trailer brake actuating member being adapted when engaged with the brake actuating member on the tractor to transmit brake operating movement to the trailer braking means, a brake applying element on the trailer displaceable between an operative and inoperative position adapted to be displaced as a result of the coupling of the trailer to the tractor into an inoperative position for permitting of said trailer brake actuating member being operated from the tractor and of the trailer brake being applied or released by the tractor driver at will, said brake applying element being further adapted to be displaced as a result of the uncoupling of the trailer from the tractor, automatically into its operative position so as then to effect application of the trailer brake, said element being adapted to retain the trailer brake in the on position while the trailer remains uncoupled from the tractor.

For instance said brake applying element may comprise or embody one or more spring members adapted to be stressed when the trailer is coupled to the tractor so as then to act as a buffer during the coupling operation, the arrangement being such that the spring stress is released to thereby effect application of the trailer brake when the trailer is uncoupled from the tractor.

A further feature of the invention consists in the provision on the trailer of manually operable brake releasing and applying means adapted also to adjust the extent to which the trailer brake is applied by a given displacement of the tractor brake operating means when the trailer is coupled to the tractor.

For instance, the brake operating movement may be transmitted from the trailer brake actuating member through the medium of a lever pivoted on a fulcrum pivot connected to a manually displaceable member constituting said brake applying and release means the effect of displacing such manually adjustable member being to vary the position in the fulcrum pivot and thus effect the desired adjustment and/or application and release of the trailer brake.

The invention is illustrated in the accompanying drawings wherein:

Figure 1 is a side elevation showing the rear end of a tractor vehicle and the front end of a trailer vehicle embodying one form of braking mechanism in accordance with this invention, the two vehicles being depicted in position for coupling together.

Figure 2 is a view similar to Figure 1 but showing the two vehicles in the relative position which they occupy when actually coupled together.

Figure 3 is a plan view of part of the front end of the trailer vehicle depicted in Figures 1 and 2 and showing the parts in the position which they occupy when the trailer is uncoupled from the tractor and the trailer brake is automatically applied.

Figure 4 is a cross sectional view taken on the line 4—4 of Figure 3.

Figure 5 is a sectional view to an enlarged scale on the line 5—5 of Figure 4, the parts being depicted in the same position as that of Figure 3 i. e. with the trailer uncoupled from the tractor and the trailer brake applied.

Figure 6 is a view similar to Figure 5 showing the parts in the position which they occupy when the trailer is coupled to the tractor and the trailer brake is in the off position.

Figure 7 is a sectional view with the parts in the same position on the line 7—7 of Figure 6.

In the drawings the invention is depicted as applied to a trailer road vehicle of generally conventional form, but provided with temporary supporting wheels at its front end, adapted as described in the specification of my co-pending application No. 391,287 of today's date, to be displaced from an operative to an inoperative position by the coupling of a tractor to this trailer vehicle.

The trailer vehicle, part of which is indicated generally at 10 in the present specification, comprises a pair of longitudinal members 11 joined at their forward ends by a pair of transverse members 12 beneath which is mounted a turn-table undercarriage indicated generally at 13, to which is pivotally connected about a horizontally transverse axis at 14 a pair of transversely spaced legs 15, the lower ends of which carry the temporary front supporting wheels for the trailer, as described in the aforesaid specification.

The turn-table undercarriage further supports a pair of transversely extending coupling pins 16 adapted to engage with correspondingly spaced coupling hooks on the tractor, whereby the two vehicles may be coupled together as described in the aforesaid specification.

The trailer, at a position beneath the forward end of the turn-table undercarriage 13, is provided with a longitudinally slidable brake actuating member 17 which as shown in Figure 5 is formed as a flat horizontal plate of substantially T configuration with the central limb 18 thereof extending forwardly of the trailer, the free end of this limb being formed or provided with a transversely extending cylindrical portion 19 adapted to be releasably interengaged by a tractor brake actuating member 20 in the form of an upstanding arm carried by a horizontal transversely extending spindle 21, supported for pivotal movement upon a rear portion of the tractor chassis and as shown in Figure 7 being connected by arm 22 to a brake rod 23 which is connected in any convenient way to a brake operating means such as a hand lever or foot pedal in the driver's compartment, not shown, of the tractor vehicle.

The arrangement is such that the tractor brake actuating member 20 is pivoted in a direction such that its upper end moves rearwardly when application of the trailer brake is desired.

The trailer brake actuating member 17 is formed at its rear end adjacent the inner end of each of its lateral arms 24 with a notch 25, as shown in Figure 5, in which works one of the arms 26 of a bell-crank lever 27 pivoted at 28 about a horizontal substantially transverse axis to the forward part of the turn-table undercarriage 13, the arrangement being such that the bell-crank lever 27 as well as the actuating member 17 are supported by the turn-table undercarriage 13 so as to turn therewith about a vertical axis in relation to the remainder of the trailer.

The arm 29 of the bell-crank lever 27 engages freely with the lower end of the plunger 30, which is freely slidable in a vertical direction within a hole 31 formed centrally of the turn-table undercarriage 13, the arrangement being such that the axis of the plunger 30 is coincident with the axis of pivoting of the turn-table undercarriage.

The upper end of the plunger 30 is pivoted at 32 between a pair of plates forming one arm 33 of a bell-crank lever 34, which lever is pivoted at 35 about a horizontally transverse axis to a rigid part of the front end of the trailer chassis.

The other arm 36 of this bell-crank lever 34 is of curved configuration so as to be formed on its rear side with a cam face 37 which engages with a cam follower 38 carried rigidly on the upper side of a slide bar 39 which extends longitudinally of the trailer so as to be supported for longitudinal sliding movement on a rigid part of the front end of the trailer.

This slide bar 39 is formed with a longitudinally extending slot 40 through which projects the upper and operative end of the bell-crank lever arm 36.

As shown in Figure 3, the forward end of the slide bar 39 is pivoted at 41 to one end of a lever 42, which lever intermediate its ends is carried on a fulcrum pivot 43, the opposite end of the lever being pivoted at 44 to a brake rod 45 connected to the trailer braking means (i. e. the brake shoes) in the usual way.

The fulcrum pivot 43 is mounted on the rear end of a link 46, the front end of which is pivoted to a manually operable lever arm 47 pivoted at 48 to a fixed part of the trailer chassis, the arm 47 being adapted releasably to engage with a toothed rack or quadrant 49 and being provided with a handle portion 50.

Considering for the moment the slide bar 39 to be in a stationary position, it will be appreciated that the effect of pivoting the manually operable lever arm 47 will necessarily be to displace the trailer brake operating rod 45 in a direction for either applying or releasing the trailer brake manually, and will further displace the position of the fulcrum pivot 43 of the lever 42 in relation to the slide bar 39 and thus effect brake adjustment also.

The lever arm 47 thus performs a dual function of enabling manual application or release of the trailer brake being effected irrespective of its operation from the brake actuating member 17 acting through the slide bar 39 which lever arm 47 is also adapted to effect brake adjustment.

The manner in which the motion is transmitted to the trailer brake operating rod 45 from the member 17 will be apparent from the foregoing description it being understood that when the forward end of the member 17 is engaged by the tractor brake actuating member 20 and this is displaced as described in a direction for sliding the member 17 rearwardly, the movement will be transmitted through the bell-crank lever 27 to displace the plunger 30 upwardly, thereby displacing the upper end of the bell-crank lever arm 36 in a rearward direction, causing the slide bar 39 to slide rearwardly thus pivoting the lever 42 in a direction for exerting a pull on the rod 45 to apply the trailer brake.

In order to effect automatic application of the trailer brake when the trailer is uncoupled from the tractor, the turn-table undercarriage 13, as best shown in Figure 5, is provided at its forward end with a brake applying element indicated generally at 51 and comprising a transversely extending leaf spring 52 of normally bowed configuration anchored centrally of its length at 53 to the turn-table undercarriage so that its two ends 54 engage freely on their forward sides with buffer blocks 55, which buffer blocks are each mounted on one end of one of a pair of brake applying arms 56, which arms are pivoted intermediate their ends at 57 about vertical axes spaced on opposite sides of the T-shaped member 17, the other end 58 of each of these arms engaging with the forward side of the arms 24 of the T-shaped member 17.

The arrangement is such that when the trailer is uncoupled from the tractor, as shown in Figure 5, the buffer blocks 55 are displaced by the spring 52 in a forward direction so as to pivot the brake applying arms 56 in a direction for displacing their ends 58 rearwardly, thereby applying a rearward brake applying movement to the trailer brake actuating member 17. As a result when the trailer is uncoupled from the tractor so that the ends 54 of the spring 52 are free the parts are in the trailer brake applying position, as shown in Figures 2 and 3.

As shown in Figure 6 the tractor is provided at its rear end with vertically extending buffer portions 59 which are each adapted to engage with the forward side of one of the buffer blocks 55 so that when the trailer is coupled to the tractor the spring 52 is stressed into the position depicted in Figure 6, swinging the arms 56 out of engagement with the brake actuating member 17 so as to permit of this member moving freely in either direction.

The trailer brake operating rod 45 is connected in the usual way to a spring, not shown, adapted to release the brake automatically when the external force acting on the rod is relieved and the effect of coupling the trailer to the tractor to stress the spring 52 and release the member 17 is thus to release the previously applied brake.

At the same time the member 17 is now brought into engagement with the tractor brake actuating member 20 so as to permit, when this is displaced in the right-hand direction in Figure 7 of the trailer brake being applied, the parts being in fact shown in Figure 7 with the brake in the off position.

The manually operable brake applying and release lever arm 47 is, as already described, effective to apply and release the trailer brake irrespective of whether the trailer brake actuating member 17 is free or is held in the brake on position by the action of the spring 52.

The spring 52 in addition to constituting the brake applying element is adapted also to provide a buffer for absorbing shock when the trailer and tractor are coupled together.

When the trailer is coupled through the coupling pins 16 to the tractor in the manner described in our specification aforesaid it will be understood that if the turn-table undercarriage 13 pivots to the limited extent which may be permitted in relation to the trailer any such pivotal movement will not affect in any way the extent to which the trailer brake has previously been applied or released by reason of the manner in which the motion is transmitted from the brake actuating member 17 through the vertically displaceable plunger 30 which as above indicated is displaceable along the axis of pivoting of the turn-table undercarriage.

If desired instead of arranging for the brake applying element 51 to operate substantially directly on the trailer brake actuating member 17 it may operate on some other portion of the mechanism through which the movement is transmitted from the member 17 to the trailer brake. For instance it might operate on the bell-crank lever 27. Alternatively the arms 56 might be extended rearwardly and provided at their rear ends with cam surfaces inclined to the horizontal and adapted to engage with a cam surface provided on the lower end of the plunger 30 at positions on each transverse side of the bell-crank lever 27 so as to displace the plunger upwardly and effect application of the brake automatically when the tractor is uncoupled from the trailer.

Whatever arrangement is adopted the manually operable lever arm 47 would normally be left in one position;

namely substantially that illustrated in Figure 3 in which when the trailer is uncoupled from the tractor so as to release the brake applying element 51 the trailer brake would be automatically and immediately applied in the manner described, thus ensuring that the trailer brake is automatically applied without any special operation for this purpose being required so that provided the lever arm 47 is in its normal position above indicated there is no possibility of the trailer running away when uncoupled from the tractor.

At the same time the provision of the lever arm 47 permits full manual independent control of the trailer brake and adjustment thereof as may be necessary and permits the trailer brake to be maintained if desired in the off position when the tractor brake is applied and the tractor brake actuating member displaced in a direction for applying the trailer brake as above described.

Further, when the trailer is coupled to the tractor the trailer brake mechanism is freed so as thus to be fully under the control of the brake operating mechanism on the tractor and operable from the driver's compartment for effecting application or release of the trailer brake.

What I then claim is:

1. In braking mechanism for a tractor propelled trailer vehicle comprising brake operating mechanism adapted automatically to apply and release the trailer brake when the trailer vehicle is uncoupled from and coupled to the tractor respectively, the provision of a chassis to the trailer vehicle, a brake applying spring, means anchoring one part of the spring to the trailer chassis, a buffer element connected to a movable part of the spring, said buffer element being positioned for buffer engagement with a part of the tractor when the latter is coupled to the trailer vehicle and being so mounted in relation to the trailer chassis as on buffer engagement with the tractor to stress said spring, means connecting a movable part of said spring to the trailer brake operating mechanism, said connecting means being displaceable in one direction by the stressing movement of the spring to effect release of the trailer brake, and said connecting means being displaceable in the opposite direction under the stress of said spring consequent on the disengagement of the buffer element from the tractor to thereby apply the trailer brake.

2. In braking mechanism for a tractor propelled trailer vehicle comprising brake operating mechanism adapted automatically to apply and release the trailer brake when the trailer vehicle is uncoupled from and coupled to the tractor respectively, the provision of a chassis to the trailer vehicle, a buffer spring on said trailer vehicle, means anchoring one part of said spring to the forward end of said trailer vehicle, a buffer element connected to another part of said spring, said buffer element being engageable with a part on the tractor, said buffer element being positioned relative to the trailer vehicle for displacement in a direction for stressing the spring when the tractor is backed into coupling engagement with the trailer vehicle, means transmitting said spring stressing movement of the buffer element to the trailer vehicle brake operating mechanism in a direction to effect release of the trailer brake, said transmitting means being adapted on release of the buffer element by the tractor to transmit loading from said spring in a direction to apply the trailer brake.

3. In braking mechanism for a tractor propelled trailer vehicle comprising brake operating mechanism adapted automatically to apply and release the trailer brake when the trailer vehicle is uncoupled from and coupled to the tractor respectively, the provision of a chassis to the trailer vehicle, a buffer spring of elongated configuration, a support for said spring carried by the forward end of the trailer vehicle chassis, means anchoring one part of said spring to said support, an arm pivotally connected to said support, a buffer element on one part of said arm in operative engagement with another part of said spring and positioned for buffer engagement with a part on the tractor when coupled to the trailer vehicle, a brake operating member mounted movably on said support and provided with an abutment engageable releasably from the tractor, means transmitting brake operating movement from said slidable brake operating member, an abutment on said pivoted arm freely engageable with a further abutment on said brake operating member, said spring being adapted to pivot said arm in a direction for displacing said buffer element forwardly in relation to the trailer vehicle, said arm when so pivoted being adapted to displace the brake operating member in a direction for applying the trailer brake, said buffer element being displaceable rearwardly in relation to the trailer vehicle in a direction to stress said spring and effect disengagement of said arm abutment from said brake operating member abutment to free said brake operating member and permit of release of the trailer brake.

4. In braking mechanism for a tractor propelled trailer vehicle comprising brake operating mechanism adapted automatically to apply and release the trailer brake when the trailer vehicle is uncoupled from and coupled to the tractor respectively, the provision at the forward end of the trailer vehicle of a support member, a buffer spring of normally bowed leaf configuration, means anchoring said spring centrally at its length to said support with opposite ends of the spring extending horizontally on opposite transverse sides of said anchorage with each of said spring ends projecting forwardly of the trailer vehicle in relation to said anchorage, a pair of lever arms pivoted to said support about a substantially vertical axis one on each side of said anchorage, a brake operating member mounted on said support for slidable movement longitudinally of the trailer vehicle and extending between said two arms, an operating abutment engageable from brake actuating means on the tractor provided on the forward end of said slidable brake operating member, braking movement transmitting means in operative engagement with the rear end of said longitudinal slidable brake operating member, transversely extending abutments on opposite sides of said operating member having forwardly directed abutment faces engageable each with one of said arms at one side of their respective pivots, buffer elements carried by each of said arms on the opposite sides of their respective pivots, said buffer elements engaging on their sides which are directed rearwardly of the trailer vehicle with the forwardly directed sides of a corresponding buffer spring end and the forward sides of each of said buffer elements being engageable with the tractor vehicle in a direction to displace the free ends of said normally bowed spring rearwardly of the trailer vehicle when the tractor vehicle is coupled thereto.

References Cited in the file of this patent

UNITED STATES PATENTS

| | | |
|---|---|---|
| 1,660,946 | Winn | Feb. 28, 1928 |
| 2,048,692 | Gardner | July 28, 1936 |
| 2,049,656 | McCollum | Aug. 4, 1936 |